United States Patent [19]

Colombani et al.

[11] 4,120,714
[45] Oct. 17, 1978

[54] APPARATUS FOR SETTING BEAD RINGS ON THE CARCASS OF A VEHICLE TIRE

[75] Inventors: Bruno Colombani; Antonio Pacciarini, both of Milan, Italy

[73] Assignee: Industrie Pirelli S.p.A., Milan, Italy

[21] Appl. No.: 789,638

[22] Filed: Apr. 21, 1977

[30] Foreign Application Priority Data

May 12, 1976 [IT] Italy ................. 23171 A/76

[51] Int. Cl.² .......................................... B29H 17/12
[52] U.S. Cl. ..................................... 156/131; 156/403
[58] Field of Search .................. 156/135, 123 R, 131, 156/132, 394 R, 398, 400–403

[56] References Cited

U.S. PATENT DOCUMENTS

| 2,605,198 | 7/1952 | Haase | 156/402 |
| 3,721,600 | 3/1973 | Cantarutti | 156/401 |
| 3,839,115 | 10/1974 | Leblond et al. | 156/403 |
| 3,944,456 | 3/1976 | Cantarutti | 156/398 |
| 3,990,931 | 11/1976 | Leblond et al. | 156/400 |

FOREIGN PATENT DOCUMENTS 1,519,770  2/1968  France.
2,043,295  2/1971  France.
2,161,204  6/1973  France.

Primary Examiner—John E. Kittle
Attorney, Agent, or Firm—Stevens, Davis, Miller & Mosher

[57] ABSTRACT

An apparatus is provided for assembling reinforcing rings and bead filler with a vehicle tire carcass. The apparatus has an expandable drum and a device for centering and locking the rings on the drum. The device comprises a support member which is coaxial with the drum and has bars which form a cage slidably disposed on the drum. The device also has a centering device for centering the rings on the drum.

16 Claims, 8 Drawing Figures

APPARATUS FOR SETTING BEAD RINGS ON THE CARCASS OF A VEHICLE TIRE

The present invention relates to a device for assembling the metal rings used for reinforcing the beads of a motor vehicle tire with the tires casing on a drum used to make the tire and, more particularly, to a method and a device for centering and arranging the metal rings in an exactly pre-fixed position with respect to an expandable type manufacturing drum, and for assembling the rings with the fabrics of the casing which are wound ring-like on the drum.

It is known that two manufacturing drum types exist, each of which requires a different type of equipment for assembling the rings and the casing being manufactured. These two types of equipment will be generically called as usual, hereinafter, as a "bead ring setting device."

One of these drum types is a rigid contractible cylindrical one, which only serves for manufacturing the casing in the form of a cylindrical sleeve without a tire tread. The sleeve is then shaped into a toroidal form, after it has been removed from the drum.

In this case, the rings are applied on the casing fabrics in coincidence with the area of the drum's shoulders. The shoulders can be very high, i.e. of the so called "with undercut" type, thus allowing the construction of the casing bead into the final shape it shall have in the finished tire. In this way, only that portion of the casing arranged into a cylindrical shape on the external surface of the drum between the shoulders undergoes shaping into a toroidal configuration. Shifting devices are then used for applying the rings to the carcass. These devices support the rings along their radially internal surface for centering them on the drum axis, and along their axially external surface, always with respect to the drum, for pressing them axially against the shoulders.

It is obvious that with such a device it is immaterial whether the rings are provided with rubber fillets, usually called bead filler, although they usually are.

The second drum type is the so called expandable one. This drum permits shaping of the cylindrical sleeve into a toroidal configuration whether it has been manufactured separately on a rigid drum, or directly on the expandable drum. In this second type, a conventional process is used to fit the reinforcement rings for the beads on the drum, which is maintained in a cylindrical shape, after the desired number of casing fabrics has been wound on said drum.

The bead rings are longitudinally shifted along the drum and are stopped in a position and at an exactly pre-set reciprocal distance from each other. This leaves both ends of the casing fabrics protruding axially towards the exterior with respect to the whole of the rings. Thereafter, the drum is expanded. The casing fabrics wrapped about the drum are in this way pressed and finally blocked against the radially internal surface of the rings. Then, the drum expansion continues in the area between the rings which are moved simultaneously towards each other until the desired toroidal shape of the tire casing is obtained.

These ring setting devices of the previous type are no longer suitable for their purposes because devices which leave the radially internal surface of the rings free and which allow their axial shifting along the drum are required. This is why numerous devices for grasping rings along their radially external surface have been proposed. All of these devices allow the centering of the ring to the drum axis, but they do not allow the use of rings which have already been provided with a bead filler.

Pliers-style devices have been proposed recently which press the ring, already assembled with its bead filler, axially on both sides thereof to overcome this difficulty and for centering the ring with respect to the drum's axis, performance not possible with these devices, the metal ring is previously fitted onto a ring-link truncate conical or cylindrical surface, coaxially arranged, fixed, on the drum side, from which then the ring is taken off by said pliers-style setting device.

Moreover, these devices are not free from defects. First of all, any handling of the ring after it has been grasped by the setting device can cause the ring to become off-center with respect to the axis of the setting device. This axis, of course, coincides with the axis of both the drum and the centering surface. This problem is important because it hinders revival of surface adhesiveness, especially of the internal surface of the ring, before the ring is fitted around the casing fabrics. This step is normally manually carried out.

It is customary to make intermediate products in the manufacture of the casing. These intermediate products are prepared in advance of the actual manufacture and the waiting time before the casing is completed for aging by a number of chemical phenomena which are involved in non-vulcanized rubber, cause the intermediate products to lose their natural stickiness. This stickiness must be restored when the intermediates are used by reviving the stickiness of the surface. This step is manually carried out by means of brush and gasoline.

Of course the surface thus revived has to be brought into contact only with the surface it has to adhere to and as soon as possible to avoid loss of adhesiveness due to the soiling and deterioration of the treated surface. It is therefore evident that the ring, too, with its bead filler has to be revived before it's used, a step which is of particular importance because the bead is an extremely critical part of the tire. Both the life and the fatigue of the tire during its use are affected by the conditions of the bead.

We may observe that such a step is possible with setting devices for expandable drums which lock the ring along its radially external surface, leaving thus the radially internal one free, which can be revived before fitting the ring on drum fabrics, of course without this to cause its shifting from its coaxially centered position.

On the contrary, this step is not possible with pliers-style devices for fitting rings which have been provided with bead fillers because if the adhesiveness of the ring has been already revived on its radially internal surface, it cannot be fitted any longer on the ring-like centering surface. If the ring has already been taken off by the setting device, it cannot be revived any longer, without loss of its centering. Therefore, non-revived rings have to be fitted on the casing, which then cause a defective or lack of adhesiveness between the ring and the casing fabrics of the bead, with the consequent qualitative worsening of the finished product.

Further defects of such devices have been shown during the manufacture of casings having a great number of fabrics or with the use, according to the most recent technology of metallic fabrics, coupled with hexagonal rings arranged in the bead with their base inclined with respect to the tire axis, as is the case with tubeless tires for heavy transport.

The expandable type of drums, normally formed by two radially expandable disks which are axially reciprocally shiftable but fixed to each other when rotating, lie connected to each other by an inflatable tubular bag, have a ring-like cavity on the radially external surface of the disks. This cavity is usually called the "bead seat." The ring fitted on the drum is arranged in this cavity. This cavity, which during the expansion of the drum is pushed against the ring, conglobates the latter progressively, forcing the interposed casing fabric to wholly wrap the ring, following its profile exactly.

It is, however, evident that casing fabrics and even more so metallic fabrics have a high flexional rigidity, wherefore when they are pressed by the drum disk against the ring they are not so suitable for following the profile of the latter and of the corresponding beat seat. Instead, they bring remarkable forces to bear which are capable of displacing it from its pre-set position on the drum. Furthermore, the hexagonal inclined base of the ring favors such a displacement in an axial direction towards the drum end, so that finally a variation of the desired tire development along its formed casing from bead to bead occurs.

It is further evident that casing fabrics as pressed by the hollow disk against the ring take up an approximately sinusoidal shape which shows a concavity towards the exterior under the ring, and correspondingly two convexities on both sides of the ring. These convexities force the cited pliers-like setting device to let the ring go just at the beginning of the most critical phase and before the ring is firmly held in place by the bead seat, thus leaving the ring free and subject to action of the forces and therefore also subject to anomalous displacement from its pre-set position.

It is therefore apparent that the present time setting devices for rings which have been assembled with their relative bead filler do not provide a rigorous positioning of the ring in its exactly axially pre-set position.

It may be also pointed out that another disadvantageous feature of the present setting devices is the means used for locking the axial travel of the device along the drum when the ring has reached its pre-set position.

It is known that the length of the drum used in making the tire, more exactly the distance between cited disks, is varied to allow for the manufacture of casings of different size within a certain range. On the other hand, the casing center line plane cannot be axially shifted along the manufacturing unit, because it is bound also to auxiliary devices which serve the machine (feeding towers, stitching bench, etc.). It ensues that when the drum length is varied, it is the ends of the drum which shift axially and therefore, the position of the rings with respect to a fixed reference external to the drum.

This requires that each time the length of the drum is varied, the conventional means (travel end switches, etc.) which stop the ring setting device in a pre-set axial position have to be adjusted accordingly with the risk of possible errors and, in any case, of their wearing out, time loss and cost increase.

It is therefore the object of the present invention to provide a ring setting device which is capable of overcoming all of the above disadvantages and allows for the centering of the ring with respect to the drum axis and maintenance of the centering during all of the preliminary steps to be carried out on the ring before it is positioned on the manufacturing drum, and the positioning of the ring in an extremely simple and advantageous manner, without the need of further adjustments when the length of the drum is varied, and the constrained maintenance of said positioning notwithstanding the bumping of casing fabrics, until the ring is axially securely locked within its corresponding bead seat.

It is accordingly a first object of the present invention to provide a method for assembling bead reinforcement rings to a tire casing wherein the casing fabrics are wound around a manufacturing drum of the expansion type, provided with a cylindrical shape; the centering of the rings on a plane normal to the manufacturing drum axis, in a position coaxial to it; the locking of the ring, axially, on both sides thereof in the centered position by means of a pliers-like setting device which is axially shiftable; the fitting of the rings on the drum by axially shifting the device into a pre-set position along the longitudinal development of the drum, which position is fixed with respect to the adjacent end of the drum which leaves both ends of the casing fabrics axially protruding towards the exterior with respect to the complex whole of the rings; the expanding of the casing fabrics by means of the expansion of the drum up to pressing them against the radially internal surface of said rings, then moving the setting device away and continuing then the expansion of the drum with the consequent swelling of the casing fabrics at the ring sides until they radially surpass the latter, characterized in that it comprises at least the following steps:

(1) centering the ring by means of radial thrusts directed towards the exterior, brought to bear in at least three distinct points on the radially internal surface of the ring;

(2) carrying out on the ring, after it has been centered but before it is locked, further preliminary steps before it is fitted on the drum;

(3) positioning the rings in the pre-set axial position by means of a sequence of steps which does not vary when varying the longitudinal development of the manufacturing drum; and (4) removing the setting device only when the casing fabric has radially surpassed the ring on both sides of the latter.

Among the preliminary steps of (2), the method according to the invention advantageously comprises at least one of the following steps:

checking the position of the ring in the plane normal to the axis of the manufacturing drum; and reviving the adhesiveness of the ring at least on most of its radially internal surface.

These steps are further very advantageously carried out by rotation of the ring around its own axis while it is forcibly maintained in its centered position.

Finally, the sequence of steps for positioning the rings comprises the phase of reciprocally coupling surfaces corresponding to each other, solidly on the drum end and with the corresponding device, axially shiftable, for ring locking.

A second object of the present invention is to provide a ring setting device for use on tire casing manufacturing machines of the type provided with an expandable manufacturing drum on which the casing fabrics are previously wound in a ring-like manner, formed by two operative units equal to each other, symmetrically arranged on both sides of the drum, where each of the units is suitable for the locking of a ring even though it has been already provided with a bead filler, centered in a position coaxial to the manufacturing drum in a plane normal to the axis of the drum, and to the positioning of the ring in a pre-set axial position along the longitudinal development of the drum, such as to leave the corresponding end of the casing fabrics to protrude axially towards the exterior with respect to the complex whole of rings, characterized in that each operative unit comprises at least one of the following devices:

(1) a device for centering the ring in the centered position which is suitable for bringing to bear radial thrusts directed towards the exterior in at least three distinct points on the radially external surface of the ring;

(2) a device for locking the ring in the centered position suitable for grasping the ring in at least three distinct points along its peripheral development by means of a corresponding number of pliers, each of them having one of their jaws, defined sickle, which rotates in the axial plane of the ring around an axis perpendicular to the plane in a manner known per se, while the other jaw, defined plate, is radially mobile in the axial plane; and (3) guiding means suitable for shifting the ring locking device in a longitudinal direction along the manufacturing drum, and for always stopping it in the same position with respect to the drum end, as the length of the drum is varied.

According to an especially advantageous embodiment of this apparatus, each unit comprises both the ring centering and locking devices, as well as the guiding means of the locking device, which means solidly connects both of the devices together and allows their rotation around the axis of the manufacturing drum.

In more detail, the ring centering device comprises three divaricating elements arranged spaced from each other on a suitable supporting structure, and peripherally and coaxially arranged with respect to an axis of the structure coinciding with the axis of the manufacturing drum, where each of the divaricating (spreading) elements comprises:

a lever lying in a plane axial to the structure and pivotally mounted on a support solidly with the structure, where the pivot has its axis perpendicular to the axial plane and the lever has one of its extremities radially directed towards the structure axis;

a small shoe solidly with the extremity of the lever, parallelly orientated to the structure axis having its radially external surface shaped according to a profile which matches with the one of the radially internal ring surface, where the small shoes of the divaricating elements are arranged spaced by 120° from each other on a coaxial periphery to the axis, having a radius greater than the one of the manufacturing drum, and lying on a plane normal to the axis of the drum; and means suitable for elastically rotating the lever around the pivot.

The means suitable for elastically rotating the lever around the pivot comprise a pneumatic cylinder bound to the supporting structure, whose piston rod acts on the extremity of the opposite lever, with respect to the pivot, to the one carrying the small shoe, and a spring working under tension which connects the rod to the cylinder.

In its turn, the ring locking device comprises six pliers arranged at spaced points from each other on an appropriate ring-like structure which is coaxial with the manufacturing drum, where each pliers unit comprises:

a first plate jaw, mounted on a support solid with said structure and having a flate supporting surface for the ring coinciding with a plane normal to the axis of the structure;

a second jaw, called the sickle jaw, bound at one of its extremities to the support through a pivot perpendicular to the axial plane passing through the support, and whose additional extremity, by means of its rotation around the pivot abuts against the plate, where the rotation arc of the sickle jaw around the pivot is arranged in a position radially external to the support, the sickles of the pliers abut against the relative plates in points arranged on a sole periphery coaxial to the structure and of a radius greater than the drum radius;

means for controlling the rotation of the sickle; and characterized in that:

the plate is radially mobile in both its directions on the support, where the radial motion in a centrifugal direction is opposed to by elastc means.

Further, on the radially internal extremity of the plate there is mounted an element which rotates at least around an axis perpendicular to the axial plane, radially protruding in the interior from the extremity of the plate, while the free extremity of the sickle is provided with a Teflon polytetrafluoroethylene) covering.

Finally, the above said means comprise:

a flange coaxially shiftable with respect to the manufacturing drum, provided with a ring-link truncate conical surface which is adapted to abut against a corresponding truncate conical surface of the manufacturing drum extremity in a position coaxial to the drum;

a set of curved bars uniformly distributed along the periphery of the flange and solid with it, bent into a substantially right angle so that they show a portion with radial development in a plane normal to the axis of the drum, at its extremity solid with said flange and thereafter a portion with a longitudinal development parallel to the axis of the drum, where the bars are curved, with respect to the flange on the same side of the drum and forming the generatrix of a cylindrical surface, coaxial to the drum, and having a greater diameter than the latter;

a ring coaxial to the drum and lying in a plane which is normal to the axis of the latter, solidly connecting the extremities of the longitudinal portions of the bars together, on which the ring locking device is fixed.

The flange is also freely rotating around the axis of the manufacturing drum. Moreover, conventional means are provided for adjusting the axial position of at least one of the two truncate conical surfaces, with respect to the relative mechanical element supporting it. At this point, it is evident that the coaxial ring and curved bars form precisely the already cited supporting structure of the centering device and at the same time the ring-like structure of the ring locking device. These devices are mounted on the structure in such a manner that the plane normal to the drum axis tangent to the ring fitted on the centering device externally with respect to the manufacturing drum, is also the one coinciding with the flat surface of plates of the pliers of the locking device.

In any case, the present invention will be now better understood from the following description with reference to the accompanying drawing which are given only by way of example and are not restrictive, and which illustrate a complete, especially versatile and advantageous embodiment of the invention.

FIG. 1 is a front view of the device according to a normal straight section of the manufacturing drum;

FIG. 2, which is divided into two sections A and B, is a partial side view of the equipment respectively open and closed on the manufacturing drum, where only a divaricating element and a ring locking pliers unit for their relative devices are shown;

Figure 1:
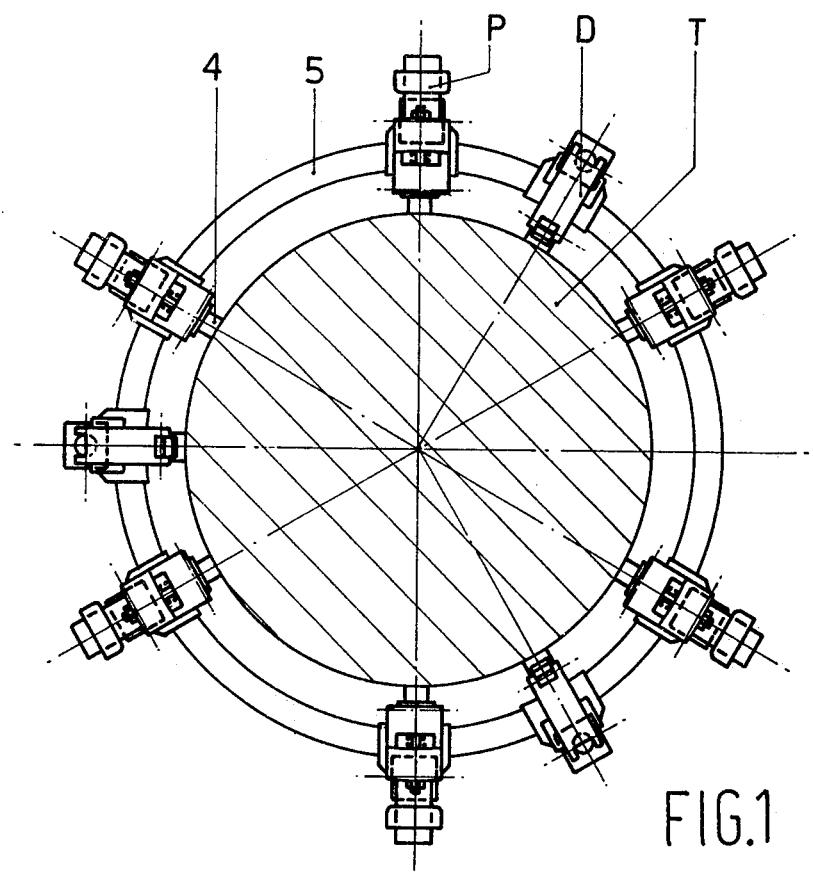

Referring now to FIGS. 1 and 2, a rings setting device has two operative units which are identical to each other and symmetrically arranged on the sides of a manufacturing drum T.

Each operative unit has a supporting structure S, which is coaxial to the manufacturing drum T and longitudinally shiftable with respect to the drum, and on which both the centering device and the ring locking device are mounted, where the structure forms precisely the complex whole of the locking device guiding means which have been previously cited.

Dealing now in detail with the supporting structure, it will be noted that it comprises a flange 1, arranged coaxially to the drum, axially slidable with respect to the extremity of the drum. On the flange, on its side facing the drum extremity is coaxially mounted a ring 2, whose external surface is truncate conical, which, when the device is brought against the drum extremity (FIG. 2B), abuts against a corresponding truncate conical surface 3, on the drum extremity. Along the periphery of the ring 2 there is uniformly distributed a number of curved bars 4. Curving of the bars is at a right angle, and the bars are arranged in a manner whereby they have their extremity solid with ring 2 lying on a plane normal to the drum axis, and their opposite extremity parallelly orientated to the axis, towards the drum. In other words, the bars form a cage which can telescopically slide with respect to and around the manufacturing drum extremity.

The free extremities of the curved bars 4 are solidly connected to each other by a ring 5 which lies in a plane normal to the drum axis.

Due to the movement of the cage, ring 5 shifts axially with respect to the drum from an external position (FIG. 2A) to an internal position (FIG. 2B) and vice versa.

On the ring 5 are fixed both the ring centering and locking devices, which now will be described in detail.

The centering device is formed by three divaricating elements F, which are fixed on ring 5, and are spaced from each other by 120°.

Each divaricating element (FIG. 3) is formed by a support 6, which is solid with ring 5 and lies on an axial plane of the ring, on which a lever 7 is pivotally mounted and which rotates around a pivot pin 8 normal to the support. The level 7 advantageously has the shape of a small square pivotally mounted at its apex; and at its radially internal extremity it carries a small shoe 9 which has its radially external surface shaped according to a profile which corresponds to the one of ring C, which has to be fitted thereon, or anyhow to allow a firm grasping of the ring C. In the case herein illustrated, the ring is a hexagonal one of the kind used for metallic casing tubeless tires for heavy transport vehicles.

The illustrated ring C has been provided with its bead filler R as described above.

The small shoe 9 is fixed on the corresponding extremity of the lever 7 by means well known to the technicians which allow adjustment of both the angular and axial positions and, in this case, also the radial one, of the small shoe with respect to the lever to adapt the device for use with various types and sizes of rings, within of course a certain range.

Figure 3:
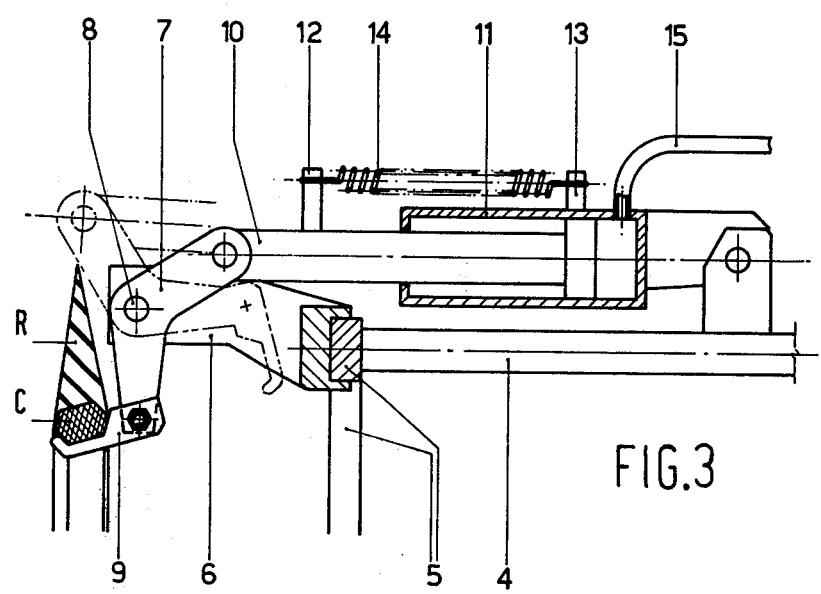
FIG. 3 shows in detail a divaricating element of the ring centering device.

The opposite extremity of lever 7 is pivotally mounted on rod 10 of the piston of a pneumatic cylinder 11, which in turn is pivotally mounted on a supporting structure S and, more exactly, on one of the curved bars 4. Pin 12 is fixed on the piston rod at a point which protrudes from the cylinder while a second pin 13 is fixed to the cylinder body in coincidence with the pin 12. A spring 14 is stretched between pins 12 and 13. Operation of the device is evident. The spring maintains the small shoe in its working position as shown in FIG. 3, and also exerts on the shoe a force which the shoe in turn transmits to the ring in a radial direction towards the exterior on its radially external surface.

Since the small shoes are three in number arranged 120° from each other and coaxially to the drum, the ring fitted on the shoes is automatically centered with respect to the drum, in a plane normal to the axis of the latter.

When, as it will be explained hereinafter, the moment has arrived in which the ring has to be abandoned, fluid under pressure is fed through conduit 15 to the cylinder 11 and piston rod 10 is pushed out of the cylinder. Piston rod 10 overcomes the resistance of spring 14 and causes lever 7, with its relatively small shoe, to rotate around pivot pin 8, getting into a position which we shall call of minimum encumbrance and which is shown with a broken line in FIG. 3. The ring is released after grasping by the locking device.

The resistance of the spring can also be manually overcome, which regularly occurs when fitting the ring on the device. It is in fact evident that if small shoes 9 were rigidly locked in their working position as shown in the drawing due to the presence of the retaining beak on the small shoe extremity, the fitting of the ring, which is not deformable due to its dimensions, onto the device would be impossible. On the contrary, in this manner the operator, exerting an appropriate pressure on the small shoe and therefore on the lever, can shift it from its position thus being able to easily fit ring 2.

Examining now the locking device it will be noted that it consists of six pliers P (FIG. 1) fixed on ring 5, spaced from each other and with the separating elements D.

Of course the number of pliers as well as the number of divaricating elements is not critical, for it is only required that they be in sufficient number, in relation too, to their peripheral distribution, in order to center the ring and to maintain the latter in its centered position.

Figure 4:
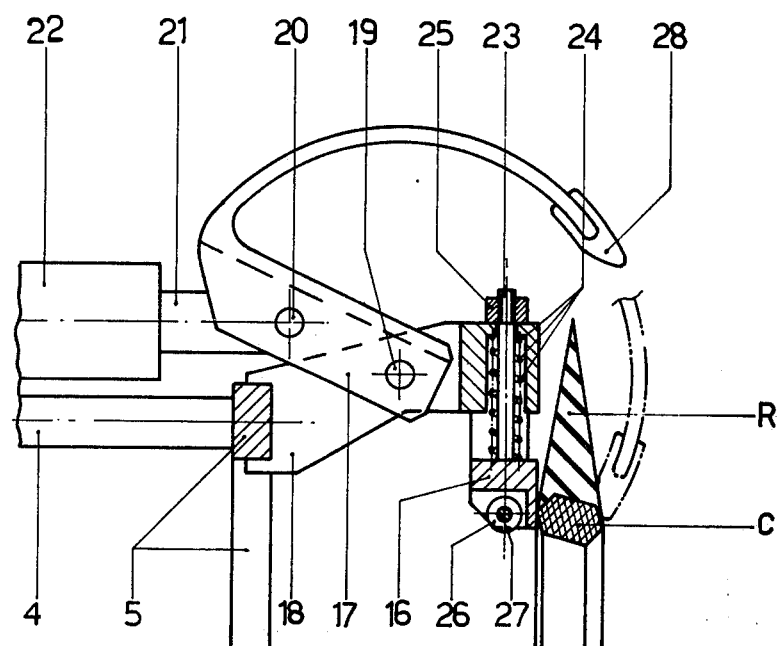
FIG. 4 shows a pliers unit of the ring locking device.

Each pliers unit P is formed by two jaws, plate 16 and sickle 17, respectively, as shown in FIG. 4.

Plate 16 is mounted on a support 18 which is analogous to support 6, i.e. it too lies in an axial plane of ring 5 and is fixed to the latter. Sickle 17 is pivotally mounted on the same support at one of its extremities. Sickle 17 rotates around pivot 19 normal to the support.

Sickle 17 is also pivotally mounted at another point (pivot 20) on piston rod 21 of a pneumatic cylinder 22, and which in turn is pivotally mounted on one of bars 4 and support S which is completely analogous to cylinder 11.

It is immediately evident, and, on the other hand this device part is not new, that the feeding of fluid to cylinder 21 causes the sickle to rotate around the pivot 19, against the plate 16, in the direction illustrated in FIG. 4 by broken lines. The plate 16 is connected to support 18 through a pivot 23 radially oriented with respect to ring 5, and wrapped by spring 24, lodged in an appropriate cavity of the support and protruding from the radially external surface of the latter, and locked at the extremity by means of a nut 25 or other suitable means for preventing the pivot from slipping out of the cavity.

It is now evident that by overcoming the force of spring 24 it is possible to shift plate 16 in a radial direction towards the exterior.

On the radially internal extremity of the plate there is mounted a small roller 26, freely rotating around a pivot 27, normal to the axial plane of ring 5, containing the support 18 and the pivot 23.

Finally, the free extremity of sickle 17 is covered by a cap 28 of a material unaffected by the stickiness of non-vulcanized rubber.

The problem of reviving the adhesiveness of the semifinished products before their use has been discussed above. It is to be understood that the extremity of sickle 17 which is pressed against the bead filler of ring C for locking it in position, if not conveniently protected, would adhere to the bead filler, which might cause a shifting of ring C with respect to the drum when the ring is removed or it might hinder it from being removed, thus forcing the operator to interrupt the working cycle and to manually intervene with all of the disadvantages arising therefrom. In practice, a Teflon cap has proved to be very advantageous.

Now that the structure of the device has been described, it is possible to illustrate its operation in a complete working cycle which is started with the fitting of a ring C already provided with its bead filler on the centering device of each unit.

Figure 2A:
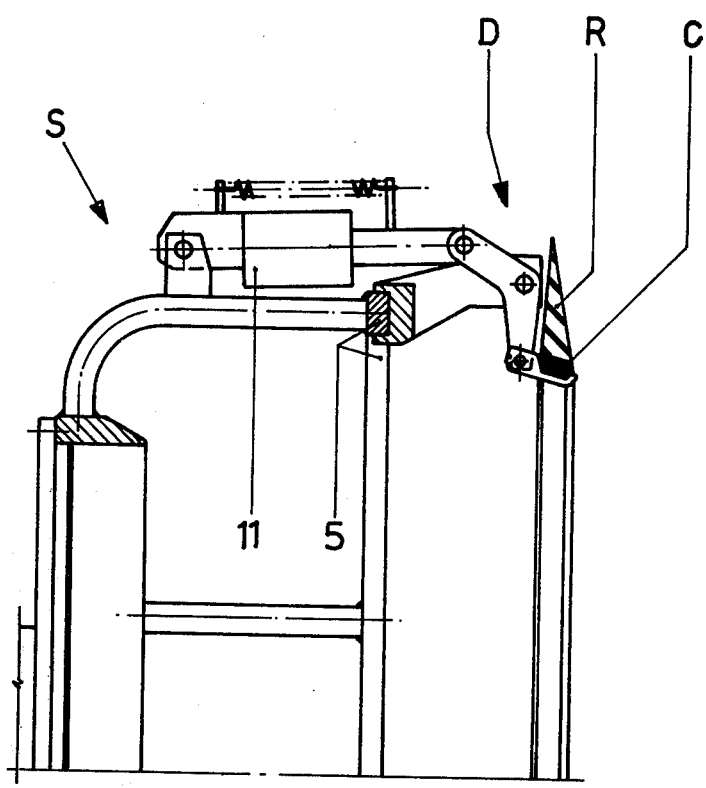
Figure 2B:
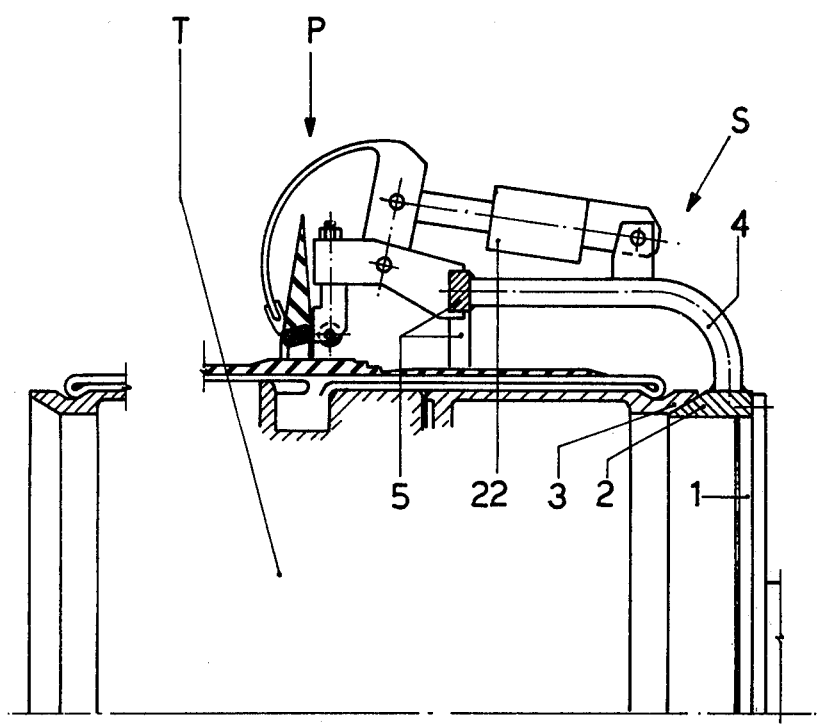

The operation is not expressly shown in the drawing as its understanding is obvious. It has already been said that the installation of the ring C is made possible thanks to the elastic mounting of small shoes of divaricating elements on the supporting structure thereof, and it is evident that such fitting-on of the ring is carried out with the centering device located externally with respect to the manufacturing drum (FIG. 2A). At this point, two fundamental steps are carried out, i.e. the checking of the ring lying on a plane which is normal to the drum axis, and the reviving of the adhesiveness of the surfaces of the ring and its bead filler.

The first of these steps is carried out by rotating the support structure S and, with it, the ring itself; and simultaneously sighting the latter by means of fixed references therefor. Besides, it is not the case to dwell here on this aspect which, in addition, is beyond the scope of the present invention. It shall here suffice to observe that the checking is not possible with the equipment of the prior art, which shows centering devices, as the already cited coaxial cylindrical or truncate conical surfaces fixed both as to their rotation and axial shifting thereof.

The described step is not important because the centering device according to the invention may give rise to erroneous shiftings, but because the ring, due to bad manufacture or subsequent damages thereof, might be deformed, i.e. may not be perfectly circular or coplanar, and must therefore be rejected.

The second step carried out on the ring and its bead filler is the reviving of its adhesiveness. This is done manually with a brush and gasoline. The importance of the manner for carrying out this step has already been noted. It should be pointed out how such a step might be carried out without the ring becoming off-center and how it can be applied also on the radially internal surface of the ring.

At this point the ring is ready for positioning on the drum, wherefore it has to be transferred on the locking device. From FIG. 2, section A, it is in fact evident that it is not possible to carry out such positioning or rather such transferring of the ring with the equipment already telescopically fitted on the drum. There would not be sufficient space left for bringing the small centering shoes into their position of minimum encumbrance, for during their rotation they would interfere with the drum surface.

On the other hand, the transferring does not involve any actual shifting of the ring because the ring, fitted onto small shoes of the centering device, simultaneously leans against plates 16 of the locking device pliers.

Cylinder 22 is then fed closing the sickle 17 on the bead filler 4 in proximity of the ring, which is thus firmly grasped by the locking device in a centered position with respect to the drum and which has been imposed on it by the centering device.

The latter is now led into the position of minimum encumbrance by the actuation of cylinder 11, after what it is possible to position the rings on the manufacturing drum which has been previously wrapped with casing fabrics. This step is carried out by bringing the supporting structure S axially against the extremity of the drum T until the truncate conical ring 2 abuts against the corresponding truncate conical surface 3 (Section 2B).

For adjusting the position of the ring on the drum with respect to the extremity of the latter, either surface 2 or 3 or both of them can be advantageously provided with known means not shown, for varying the axial position of the surface with respect to their carrying surfaces. Another characteristic of the present invention is now evident. It has already been described how the axial development of the drum may be varied within a certain range. It is, however, evident that the position of the ring with respect to the extremity of the drum will not vary at all when varying the development, because the position is imposed by the coupling between the corresponding surfaces 2 and 3. On the other hand, and without any supplementary adjustment, the axial travel of the supporting structure S will vary. Finally, it is apparent that the result is an apparatus of a very simplified structure which operates in a more reliable and constant way.

Figure 5:
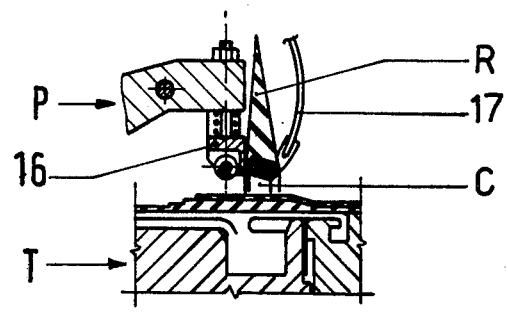
FIGS. 5, 6 & 7 show three successive moments of the ring shifting step, i.e. in their order, its positioning on the drum, the radial expansion of the drum, and the removal of the ring locking device at the end of the step.

With the rings exactly positioned on the drum (FIGS. 2B & 5), radial expansion of the drum is started with simultaneous expansion of the bead seats.

At a certain point the casing fabric wrapped about the drum comes into contact with the ring and simultaneously with small roller 26 of pliers P. As the expansion continues, the ring, which cannot expand, sinks into the bead seat provided with an appropriate cavity, while the casing fabric wraps it, rising along its sides until it surpasses the ring.

Figure 6:
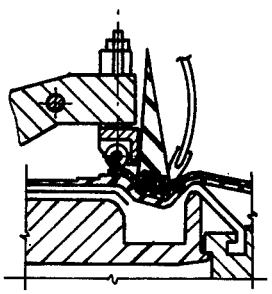

Such expansion externally of the ring of the extremity of the casing fabric is not hindered by plate 16 of pliers P which can slide radially within support 18, thus accompanying the drum surface under expansion, maintaining the ring at the same time locked in the desired centered position where it is unaffected by thrusts brought to bear on it by the casing fabric which tends to shift it from this position (FIG. 6).

Pliers unit P remains in this position until the ring is radially surpassed by the casing fabric on both sides, that is, firmly grasped by the bead seat and therefore no longer shiftable.

Figure 7:
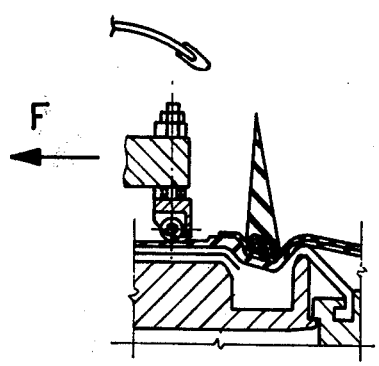

At this point the pliers unit is opened, rotating the sickle in an opposite direction, and the device is removed, by an axial movement with respect to the drum, in the direction F (FIG. 7). It will now be appreciated how the presence of roller 26 prevents the device from damaging both the casing fabric and the rubber bag of the drum by rubbing on them while pressed by spring 28 which tends to bring plate 16 into its original position.

Both operative units are therefore drawn off the drum extremities, and the divaricating elements of the centering devices are brought again into position of FIGS. 2A and 3, ready for receiving a new ring.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A method for assembling reinforcement rings of the casing beads of a tire wherein casing fabrics are wound around a cylindrical drum of the expandable type, the rings are centered in a plane normal to the axis of said drum in a position coaxial to the latter, the ring is locked axially on both sides thereof in the centered position by means of a pliers-style grasping device which is axially shiftable, the rings are fitted onto said drum by axially shifting said device into a pre-set position along the longitudinal development of the drum which position is fixed with respect to the adjacent extremity of said drum, and which leaves both extremities of said casing fabrics axially protruding towards the exterior with respect to the whole complex of said rings, the said casing fabrics are expanded by expansion of said drum and are pressed against the radially internal surface of said rings, said locking device is thereafter removed, characterized in that it comprises at least the following steps:

(1) said rings are centered by means of radial thrusts directed towards the exterior and brought to bear on at least three distinct points on the radially internal surface of said ring;
 (2) carrying out on said ring, after said centering but before said locking thereof the further step, preliminary to said fitting of said ring onto said drum, of reviving the adhesiveness of said ring, at least on most of its radially internal surface;
 (3) said locking device accompanying the drum surface under expansion at one side of said ring and said locking device being removed only when said casing fabric has radially surpassed the ring on both sides.

2. The method of claim 1 characterized in that said reviving step and a possible further step of checking of said ring lying in said plane normal to the drum axis, are carried out by the rotation of said ring, maintained forcibly in a central position around its own axis.

3. The method of claim 1 characterized in that the positioning of said ring in said pre-set axial position is carried out by means of a step sequence which is constant as the longitudinal development of said drum is varied, said sequence comprising the step of reciprocally coupling corresponding surfaces associated with the extremity of said drum and the corresponding axially shiftable ring locking device.

4. A device for setting bead rings of a tire casing on a manufacturing machine of the type provided with an expandable type drum having ring-like previously wound casing fabrics thereon, comprising means comprising two operative units equal to each other, symmetrically arranged on the sides of said drum, each of said units being suitable for the locking of a ring and bead filler in a centered position coaxial to said manufacture drum and in a plane normal to the axis of said drum, and for positioning said ring in a pre-set axial position along the longitudinal development of said drum, fixed with respect to the adjacent extremity of said drum, such to leave the corresponding extremity of said casing fabrics axially protruding towards the exterior with respect to all of said rings, characterized in that each of said operative units comprises at least one of the following:

means for centering said ring in said centered position, by applying radial thrusts directed towards the exterior on at least three distinct points on the radially internal surface of said ring; said ring centering means comprising three divaricating elements spaced from each other on an appropriate supporting structure, peripheral and coaxially with respect to an axis of said structure coinciding with the axis of said drum, each of said divaricating elements comprising
 a lever lying in a plane axial to said structure and pivotally mounted on a support which is fixed to the latter, said pivot having its axis perpendicular to said axial plane, and said lever having one of its extremities radially directed towards said structure axis;
 a small shoe fixed to said lever extremity, parallelly orientated to said structure axis, and having its radially external surface shaped to a profile which matches the one of the radially internal ring surface, said small shoes of said divaricating elements being spaced from each other by 120° on a coaxial periphery to said axis, said shoes having a radius greater than the one of the drum and lying in a plane normal to the axis of said drum;
 means for elastically rotating said lever around said pivot;
 means for locking said ring in said centered position by grasping said ring at least in three distinct points along its peripheral development each comprising pliers units provided with at least one sickle jaw which rotates in a plane axial to the ring around an axis which is perpendicular to said plane and a plate jaw which is radially mobile in said axial plane; and
 a guiding means suitable for shifting said ring locking device longitudinally along said drum, and for stopping it always in the same position, with respect to the extremity of the drum, as the length of said drum is varied.

5. The method of claim 1 characterized in that the sequence of said steps for positioning said rings comprises the step of reciprocally coupling reciprocally corresponding surfaces solid with the extremity of said drum and the corresponding axially shiftable ring locking device.

6. A device for setting bead rings of a tire casing on a manufacturing machine of the type provided with an expandable type drum having ring-like previously wound casing fabrics thereon, means comprising two operative units equal to each other, symmetrically arranged on the sides of said drum, each of said units being suitable for the locking of a ring and bead filler in a centered position coaxial to said manufacture drum and in a plane normal to the axis of said drum, and for positioning said ring in a pre-set axial position along the longitudinal development of said drum, fixed with respect to the adjacent extremity of said drum, such to leave the corresponding extremity of said casing fabrics axially protruding towards the exterior with respect to all of said rings, characterized in that each of said operative units comprises at least one of the following:
  means for centering said ring in said centered position, by applying radial thrusts directed towards the exterior on at least three distinct points on the radially internal surface of said ring; said centering means being axially movable;
  means for locking said ring in said centered position by grasping said ring at least in three distinct points along its peripheral development each comprising pliers units provided with at least one sickle jaw which rotates in a plane axial to the ring around an axis which is perpendicular to said plane and a plate jaw which is radially mobile in said axial plane; and
  a guiding means suitable for shifting said ring locking device longitudinally along said drum, and for stopping it always in the same position, with respect to the extremity of the drum, as the length of said drum is varied.

7. The apparatus of claim 4, characterized in that said means for elastically rotating said lever around said pivot comprises a pneumatic cylinder bound to said supporting structure, a pressure responsive piston and a piston rod disposed in the cylinder, said piston rod connected to extremity of said lever which, with respect to said pivot, is opposite to the one carrying said shoe, and a spring working under tension, connecting said rod and said cylinder.

8. The apparatus of claim 5 in which said ring locking device comprises six pliers units spaced from each other on an appropriate ring-link structure coaxial with said manufacture drum, each pliers unit comprising:
  a plate jaw, mounted on a support solidly with said structure, said jaw having a flat surface against which said ring leans, coinciding with a plane normal to the axis of said structure;
  a sickle jaw, bound at one of its extremities to said support through a pivot perpendicular to the axial plane passing through said pivot, whose other extremity abuts, by rotation around said pivot, against said plate, the rotation arc of the said sickle being arranged in a radially external position with respect to said support, the sickles of said pliers units abutting the relative plates in points arranged on a single periphery coaxial to said structure and having a radius greater than the drum radius; and
  means for controlling the rotation of said sickle, characterized in that
  said plate is radially mobile in both directions on said support and elastic means oppose said radial movement in the centrifugal direction.

9. The apparatus of claim 8, characterized in that an element is mounted on the radially internal extremity of said plate and rotates at least around an axis perpendicular to said axial plane and radially protrudes towards the interior with respect to said plate extremity.

10. The apparatus of claim 8, characterized in that the free extremity of said sickle is provided with a polytetrafluoroethylene covering.

11. The apparatus of claim 5, characterized in that said guiding means comprises:
  a flange coaxially shiftable with respect to said manufacture drum, provided with a ring-like truncate conical surface suitable to abut against a corresponding truncate conical surface obtained on the extremity of said drum in a position coaxial to the latter;
  a set of curved bars uniformly distributed along the flange periphery and fixed to the latter, curved at an angle which is substantially a right angle, whereby they have a portion with radial development in a plane normal to said drum at the extremity solid with said flange, and thereafter a portion with longitudinal development parallelly to the axis of said drum, where said bars are curved with respect to said flange to the same side of the drum and forming the generatrix of a cylindrical surface, coaxial to said drum, of a diameter greater than the one of the drum;
  a ring coaxial to the drum and lying in a plane normal to the axis of said drum, solid connecting the extremities of the longitudinal portions of said bars, on which the locking device of said tire casing bead reinforcement rings is bound.

12. The apparatus of claim 11, characterized in that said coaxially shiftable flange is further freely rotating around the axis of said manufacture drum.

13. The apparatus of claim 6, characterized in that means are provided for adjusting the axial position of at least one of said truncate conical surfaces with respect to the mechanical element it belongs to.

14. The apparatus of claim 6 characterized in that each operative unit comprises both said ring centering and locking devices, and that said guiding means is adapted to stop said locking device in said pre-set position along said drum and connects the said devices together, said coaxial ring and said curved bars forming said supporting structure of said centering device and said ring-link structure of said tire casing reinforcement ring locking device.

15. The apparatus of claim 14, characterized in that the plane normal to the drum axis, tangent to the ring fitted onto said centering device, externally with respect to said drum is the same plane coinciding with the flat surface of the plates of said pliers units of said locking device.

16. An apparatus for assembling the reinforcing rings and bead filler of tire beads with the carcass of a tire comprising
  an expandable drum,
  means disposed at each end of the drum for centering and locking said rings on the drum, each said means comprising in symmetrical arrangement with the other, a support member which is coaxial with the drum and longitudinally movable relative to the drum, said member having a flange disposed coaxially with the drum and axially slidable with respect thereto, a first ring mounted on said flange and having a sloping surface facing the drum, said drum having a sloping surface parallel to that of the flange which abuts that of the flange when the two are brought together, a plurality of longitudinally spaced bars fixed at one end to the first ring and having an arcuate shaped portion adjacent to the first ring and a second portion which is substantially parallel to and spaced from the drum surface, said bars combining to form a cage which slides with respect to and around the drum, a second ring fixed to the ends of said second portions of the bars and disposed in a plane normal to the axis of the drum, said second ring shifting with respect to the drum from an external to an internal position with movement of the cage, a centering means comprising three elements fixed to said second ring at points spaced about 120° from each other, each element having a support member fixed on said second ring and disposed in an axial plane of said second ring, a lever pivotally mounted on said support member and pivotally attached at one end to a shoe having a groove adapted to support said reinforcing ring and bead filler, a cylinder, a fluid actuated piston slidably disposed in the cylinder and a piston rod connected to the piston and projecting outwardly from the cylinder and connected to said lever opposite its pivot point from said shoe, resilient means fixed at one end to the cylinder and at the opposite end to the piston rod for sliding the piston inwardly into the cylinder in the absence of fluid pressure, said shoes centering the reinforcing ring and bead filler with respect to the drum in a plane normal to the axis of the drum and releasing the reinforcing ring and bead filler when moved by the outward stroke of the piston, means for grasping said reinforcing ring and filler when released by said shoes and for locking them comprising a plurality of plier members each fixed to the said second ring and spaced from each other, each plier member having cooperating plate and sickle jaws, means for supporting the jaws fixed to the said second ring, said plate jaw being connected to the support means by a pivoting member and said sickle jaw being pivotally mounted at one end on the support means, a second fluid actuated cylinder, piston and piston rod assembly mounted on said bar of said support member, said sickle jaw at a second end being pivotally mounted on the second piston rod whereby fluid actuation of the piston causes the sickle jaw to rotate around its pivot point on the support member, said pivoting member being oriented relative to the said second ring, and a spring wrapped around the pivoting member and compressed between the support member and the plate jaw.

* * * * *

UNITED STATES PATENT AND TRADEMARK OFFICE
CERTIFICATE OF CORRECTION

PATENT NO. : 4,120,714
DATED : October 17, 1978
INVENTOR(S) : BRUNO COLOMBANI and ANTONIO PACCIARINI It is certified that error appears in the above-identified patent and that said Letters Patent are hereby corrected as shown below:

In the specification, Column 1, line 7, delete "tires" and insert -- tire's --.
Column 3, line 16, delete "beat" and insert -- bead --.
Column 6, line 2, delete "flate" and insert -- flat --; line 26, delete "polytetrafluoroethylene)" and insert -- (polytetrafluoroethylene) --; line 68, delete "drawing" and insert -- drawings --.
Column 7, line 65, delete "level" and insert -- lever --.
Column 8, line 40, delete "gettng" and insert -- getting --.

In the claims:
In Claim 8, line 51, delete "5" and insert -- 6 --; line 53, delete "-link" and insert -- -like --
In Claim 11, line 14, delete "5" and insert -- 6 --.
In Claim 14, Column 14, line 53, delete "-link" and insert -- -like --.

Signed and Sealed this

First Day of May 1979

[SEAL]

Attest:

RUTH C. MASON
Attesting Officer

DONALD W. BANNER
Commissioner of Patents and Trademarks